(12) United States Patent
Don et al.

(10) Patent No.: US 10,507,636 B2
(45) Date of Patent: Dec. 17, 2019

(54) PLASTIC FLOORING HAVING THREE-DIMENSIONAL PATTERNS AND METHOD OF MAKING THE SAME

(71) Applicants: Zhao Pei Don, Tainan (TW); Lu Ding Yi, Tainan (TW)

(72) Inventors: Zhao Pei Don, Tainan (TW); Lu Ding Yi, Tainan (TW)

( * ) Notice: Subject to any disclaimer, the term of this patent is extended or adjusted under 35 U.S.C. 154(b) by 62 days.

(21) Appl. No.: 15/871,160

(22) Filed: Jan. 15, 2018

(65) Prior Publication Data

US 2019/0039366 A1 Feb. 7, 2019

(30) Foreign Application Priority Data

Aug. 2, 2017 (CN) .......................... 2017 1 0653363

(51) Int. Cl.
| | |
|---|---|
| *B32B 38/06* | (2006.01) |
| *B32B 5/20* | (2006.01) |
| *B32B 27/08* | (2006.01) |
| *B32B 27/06* | (2006.01) |
| *B32B 27/30* | (2006.01) |
| *B32B 37/10* | (2006.01) |

(Continued)

(52) U.S. Cl.
CPC .............. *B32B 38/06* (2013.01); *B29C 44/20* (2013.01); *B29C 48/002* (2019.02); *B29C 48/0022* (2019.02); *B29C 48/08* (2019.02); *B32B 3/06* (2013.01); *B32B 3/263* (2013.01); *B32B 5/20* (2013.01); *B32B 27/065* (2013.01); *B32B 27/08* (2013.01); *B32B 27/304* (2013.01); *B32B 37/10* (2013.01); *B32B 37/153* (2013.01); *B32B 38/0004* (2013.01); *B32B 38/145* (2013.01); *B32B 41/00* (2013.01); *B29C 2793/009* (2013.01); *B29K 2027/06* (2013.01); *B29K 2105/04* (2013.01); *B29L 2031/732* (2013.01); *B32B 2266/0235* (2013.01); *B32B 2471/00* (2013.01)

(58) Field of Classification Search
CPC ................ B29C 48/0022; B29C 44/20; B29C 2793/009; B29C 48/002; B29C 48/08; B32B 2419/04; B32B 38/06; B32B 5/20; B32B 27/08; B32B 27/065; B32B 27/304; B32B 37/10; B32B 37/153; B32B 41/00; B32B 38/0004; B32B 38/145; B32B 3/06; B32B 2266/0235; B32B 2471/00; B32B 3/263; B29K 2105/04; B29K 2027/06; B29L 2031/732; E04F 15/107

See application file for complete search history.

(56) References Cited

FOREIGN PATENT DOCUMENTS

GB          2100191 A  * 12/1982 ........... B29C 43/305

* cited by examiner

*Primary Examiner* — Vishal I Patel

(57) ABSTRACT

A method of making plastic flooring contains steps of: A. providing the substrate and delivering the substrate toward a rolling unit; B. delivering a printing layer, wherein the printing layer is blank and is delivered toward the rolling unit by way of a second delivery roller mechanism; C. rolling, wherein the rolling unit rolls the substrate and the printing layer, and the printing layer has three-dimensional embossing; D. digital printing, wherein color material being printed on three-dimensional embossing by using the digital print unit; E. coating an abrasion resistant layer, wherein a coating unit coats wear-resistant materials of the abrasion resistant layer on the printing layer; and F. shaping, wherein the plastic flooring material is shaped so as to dry and harden the abrasion resistant layer.

11 Claims, 6 Drawing Sheets

(51) Int. Cl.
    *B32B 37/15*     (2006.01)
    *B32B 41/00*     (2006.01)
    *B32B 38/00*     (2006.01)
    *B32B 3/06*     (2006.01)
    *B29C 44/20*     (2006.01)
    *B32B 3/26*     (2006.01)
    *B29C 48/00*     (2019.01)
    *B29C 48/08*     (2019.01)
    *B29K 105/04*     (2006.01)
    *B29K 27/06*     (2006.01)
    *B29L 31/00*     (2006.01)

PLASTIC FLOORING HAVING THREE-DIMENSIONAL PATTERNS AND METHOD OF MAKING THE SAME

FIELD OF THE INVENTION

The present invention relates to plastic flooring, and more particularly a method of making the plastic flooring which forms three-dimensional embossing on a printing layer of the plastic flooring so as to enhance aesthetics appearance of the plastic flooring.

BACKGROUND OF THE INVENTION

Conventional plastic flooring contains a substrate, a printing layer on which printing patterns are printed, and an abrasion resistant layer on which embossing are imprinted.

However, the printing patterns of the printing layer and the embossing of the abrasion resistant layer are not three-dimensional, and the printing patterns do not correspond to the embossing of the abrasion resistant layer.

In addition, the printing patterns cannot be customized based on using requirements.

The present invention has arisen to mitigate and/or obviate the afore-described disadvantages.

SUMMARY OF THE INVENTION

The primary aspect of the present invention is to provide a method of making plastic flooring which forms three-dimensional embossing on a printing layer of the plastic flooring so as to enhance aesthetics appearance of the plastic flooring.

To obtain the above aspect, a method of making plastic flooring contains steps of:

A. providing the substrate and delivering the substrate toward a rolling unit;

B. delivering a printing layer, wherein the printing layer is blank and is delivered toward the rolling unit by way of a second delivery roller mechanism;

C. rolling, wherein the rolling unit rolls the substrate and the printing layer together so as to produce the plastic flooring material, and the printing layer has three-dimensional embossing;

D. digital printing, wherein color material being printed on three-dimensional embossing of the printing layer by using the digital print unit;

E. coating an abrasion resistant layer, wherein a coating unit coats wear-resistant materials of the abrasion resistant layer on the printing layer; and F. shaping, wherein the plastic flooring material is shaped so as to dry and harden the abrasion resistant layer.

Thereby, the plastic flooring having three-dimensional patterns contains:

a substrate;

a printing layer on which three-dimensional embossing is formed, and color material is printed on the three-dimensional embossing; and an abrasion resistant layer being transparent and formed on the printing layer.

Preferably, the printing layer has a flat pattern portion and a three-dimensional embossing formed thereon.

DETAILED DESCRIPTION OF THE PREFERRED EMBODIMENTS

Figure 1:
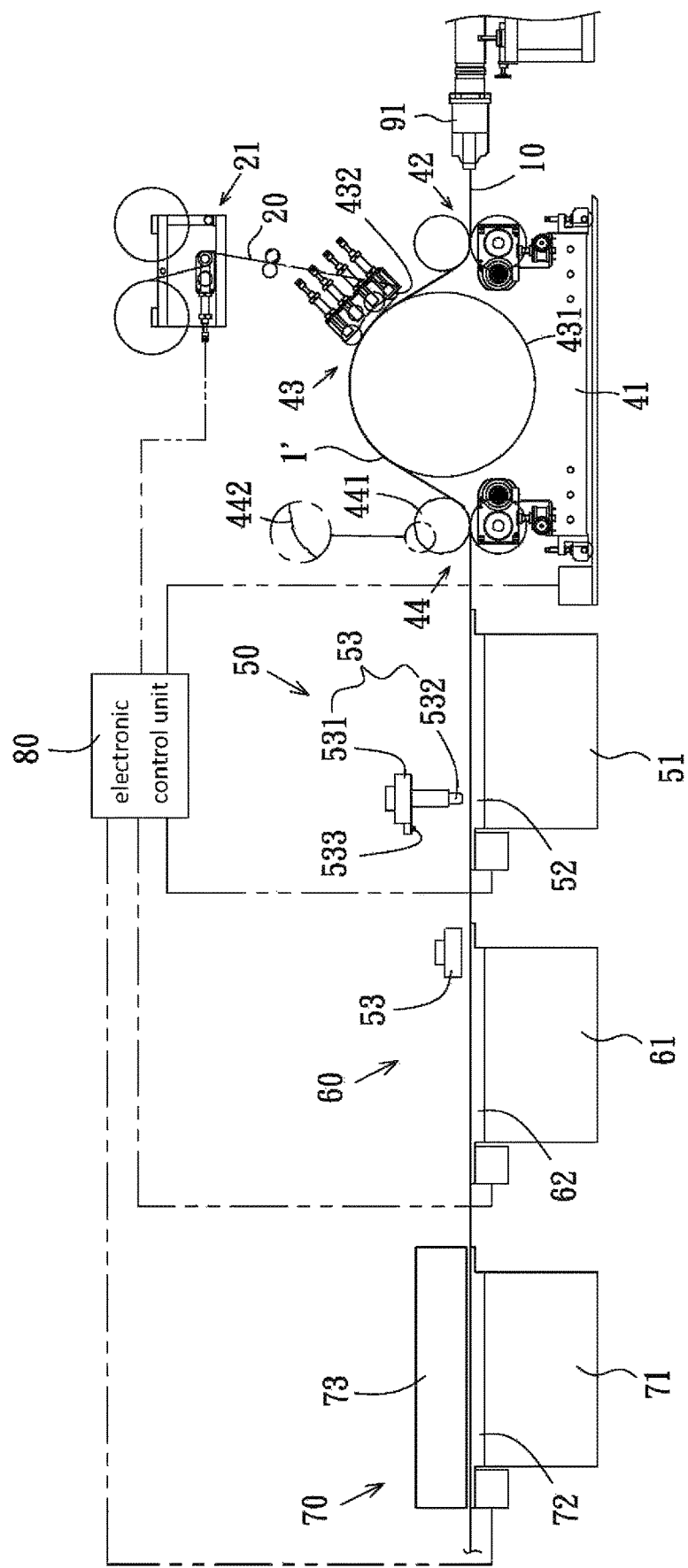
FIG. 1 is a schematic view showing equipment of making plastic flooring having three-dimensional patterns according to a preferred embodiment of the present invention.
Figure 2:
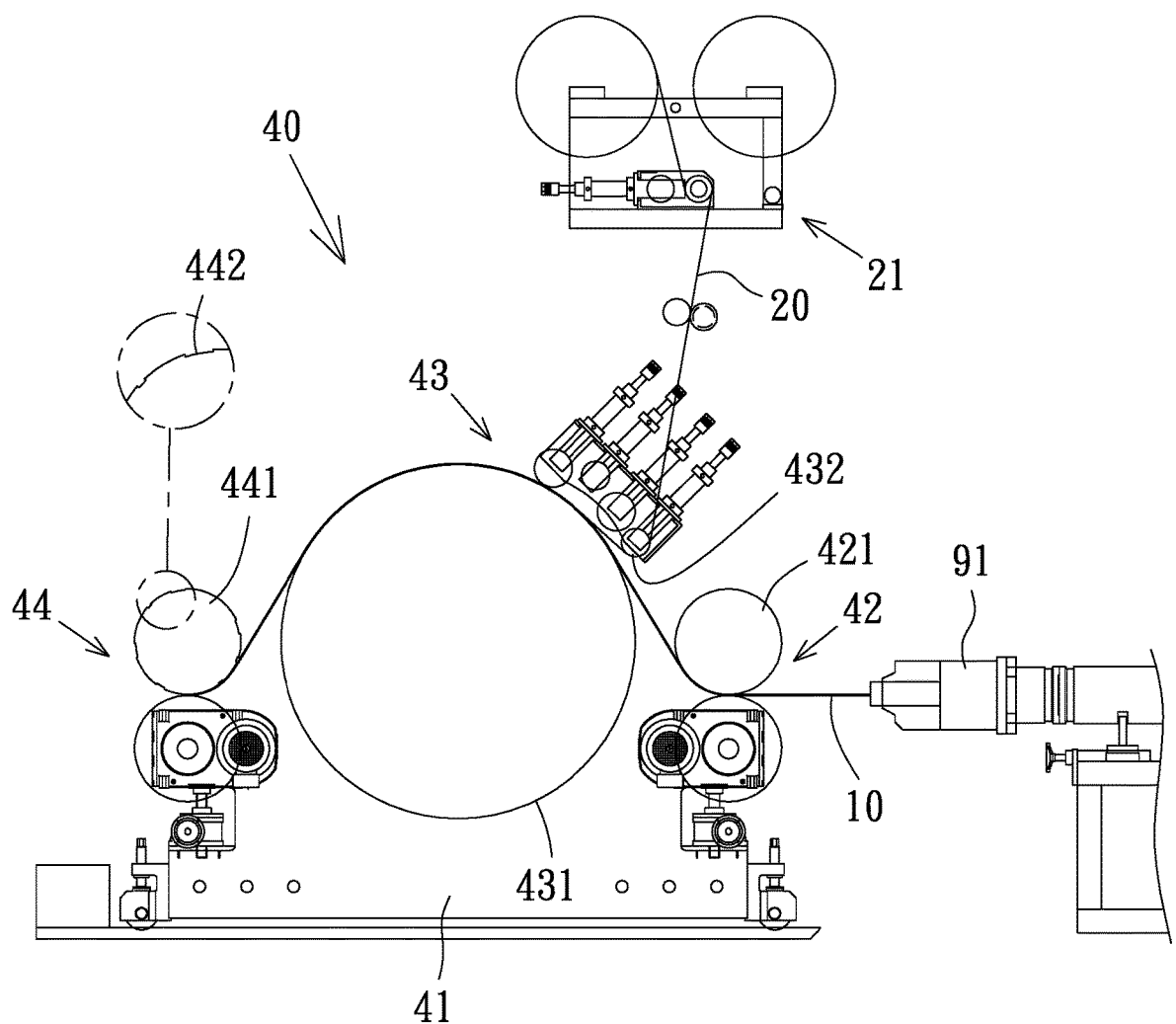
FIG. 2 is a schematic view showing a part of the equipment of making the plastic flooring having the three-dimensional patterns according to the preferred embodiment of the present invention.

Referring further to FIGS. 1-8, plastic flooring having three-dimensional patterns according to a preferred embodiment of the present invention is manufactured by using a rolling unit 40, a digital print unit 50, a coating unit 60, a baking machine 70, and an electronic control unit 80 so as to roll a substrate 10, a printing layer 20, and an abrasion resistant layer 30 together, wherein the plastic flooring has various patterns, and the printing layer has a flat pattern portion and a three-dimensional embossing formed thereon.

Figure 3:
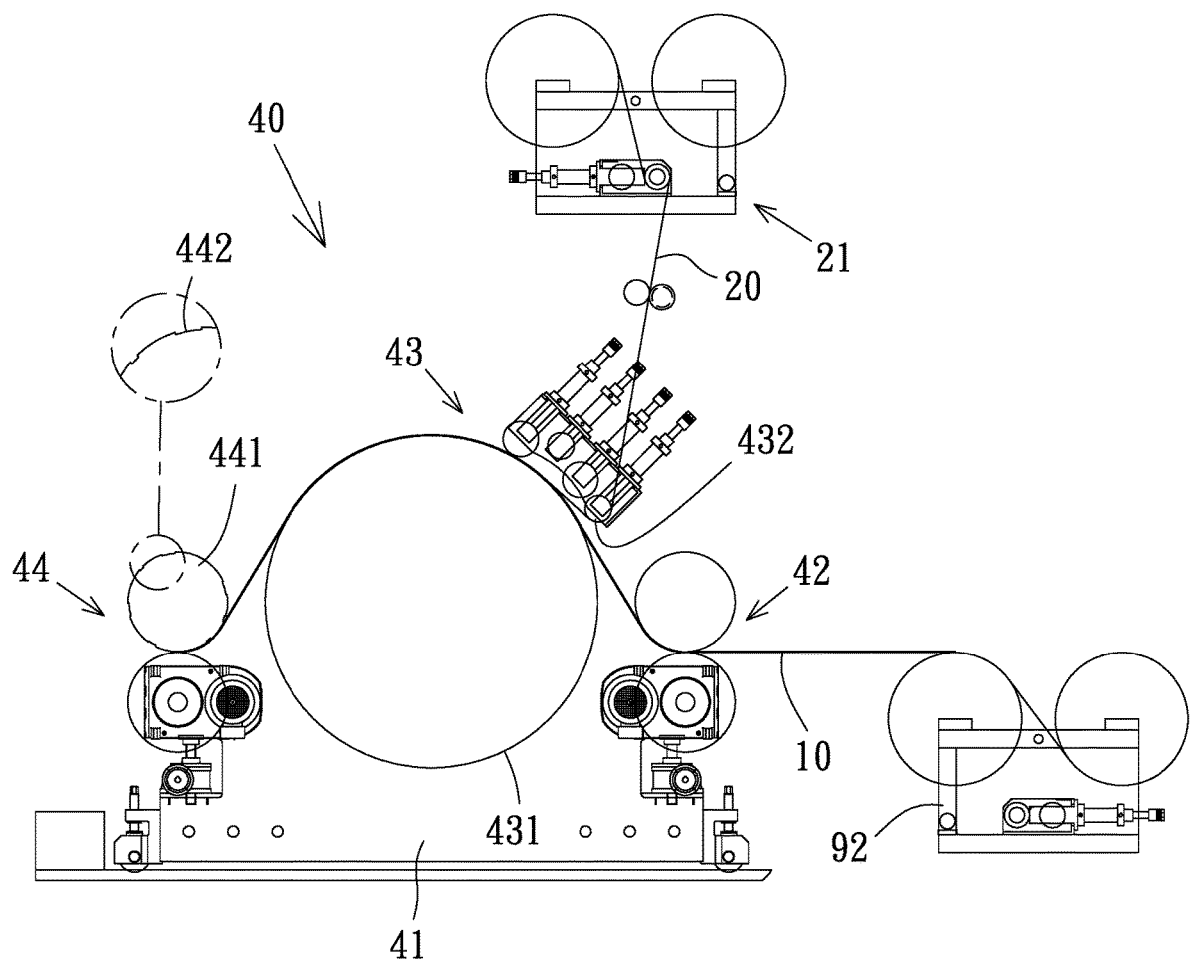
FIG. 3 is another schematic view showing a part of the equipment of making the plastic flooring having the three-dimensional patterns according to the preferred embodiment of the present invention.
Figure 4:
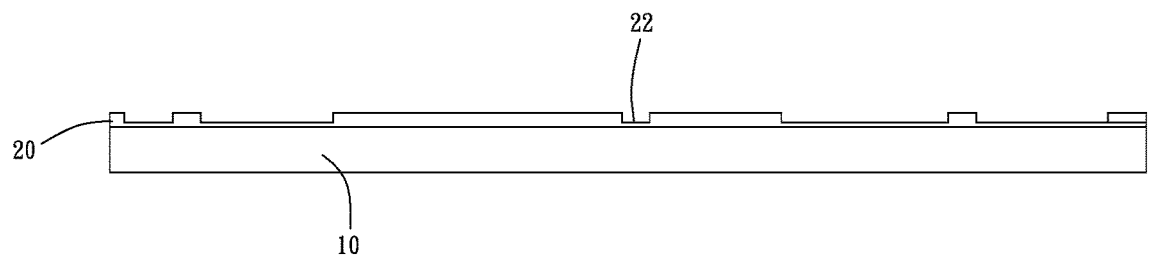
FIG. 4 is a schematic view showing a part of the plastic flooring according to the preferred embodiment of the present invention.
Figure 5:
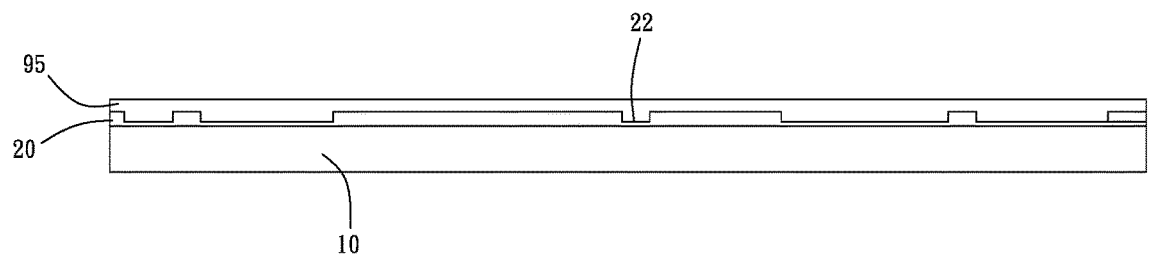
FIG. 5 is another schematic view showing a part of the plastic flooring according to the preferred embodiment of the present invention.
Figure 6:
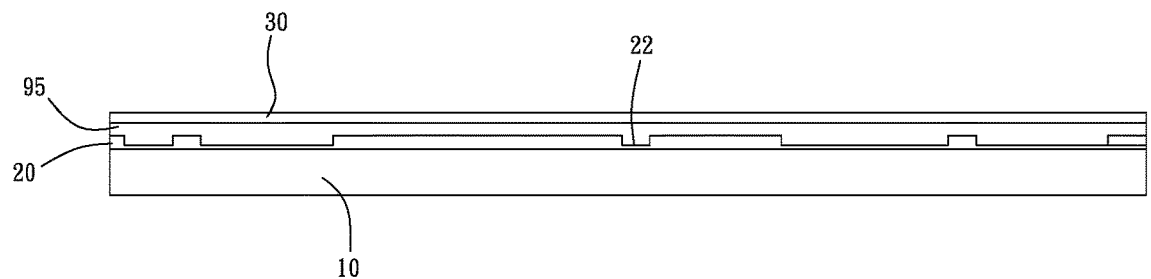
FIG. 6 is also another schematic view showing a part of the plastic flooring according to the preferred embodiment of the present invention.
Figure 7:
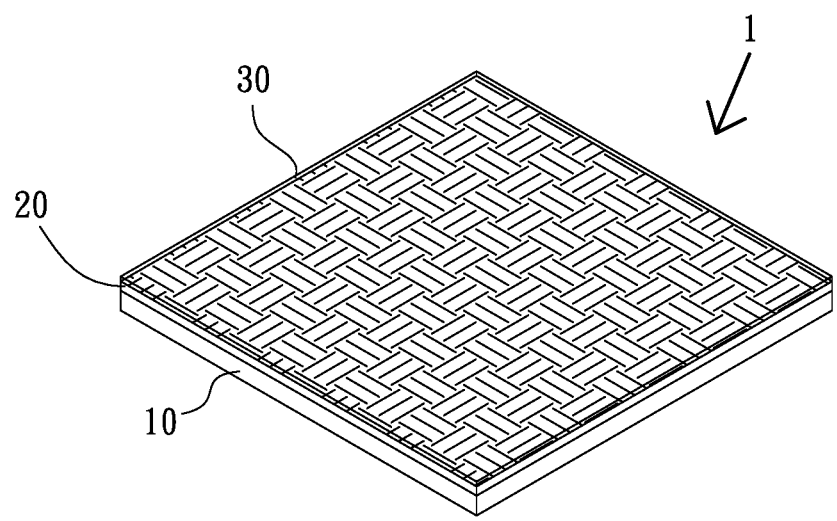
FIG. 7 is a perspective view showing the assembly of the plastic flooring according to the preferred embodiment of the present invention.
Figure 8:
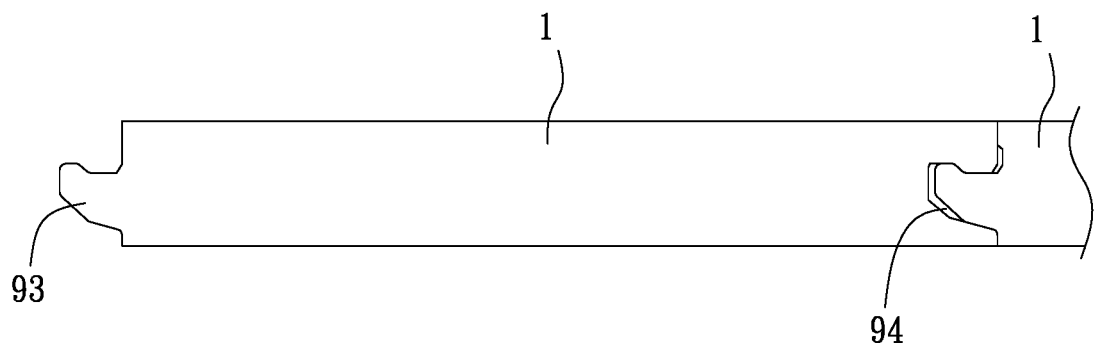
FIG. 8 is a schematic view showing the application of the plastic flooring according to the preferred embodiment of the present invention.
Figure 9:
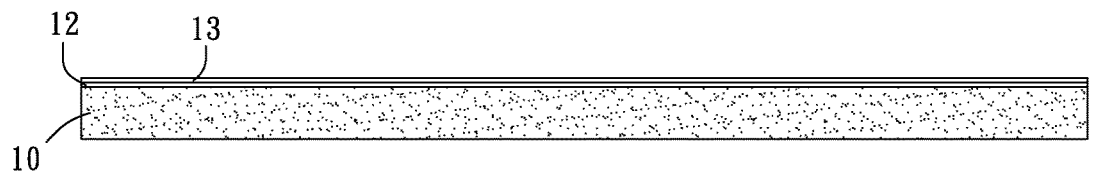
FIG. 9 is another schematic view showing the application of the plastic flooring according to the preferred embodiment of the present invention.
Figure 10:
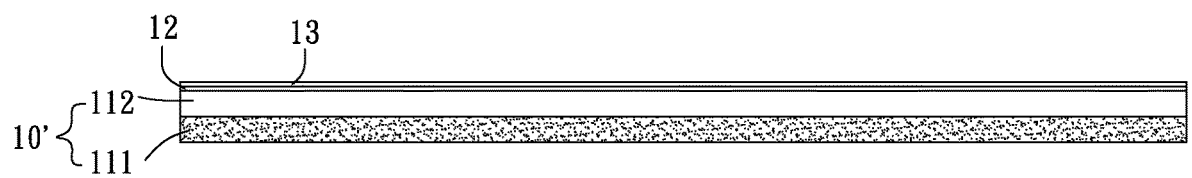
FIG. 10 is also another schematic view showing the application of the plastic flooring according to the preferred embodiment of the present invention.
Figure 11:
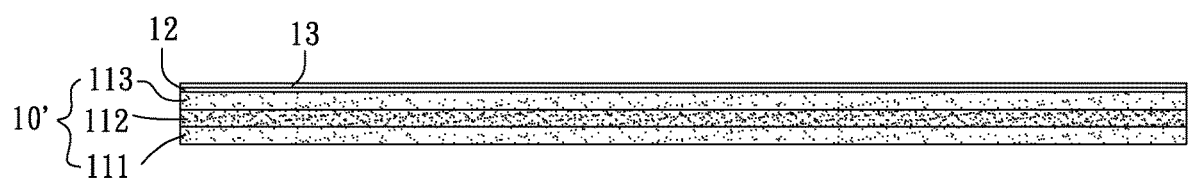
FIG. 11 is still another schematic view showing the application of the plastic flooring according to the preferred embodiment of the present invention.

A method of making the plastic flooring having the three-dimensional patterns comprises a step of:

A. providing the substrate 10 and delivering the substrate 10 toward the rolling unit 40, wherein the substrate 10 is extrusion molded before being delivered to the rolling unit 40. Alternatively, as shown in FIG. 3, the substrate 10 is rolled and delivered toward the rolling unit 40 by using a first delivery roller mechanism 92. Furthermore, the substrate 10 is extrusion molded from plastic foam material by using an extruder 91, wherein the substrate 10 is a sole-layer substrate (as shown in FIG. 9) after being extrusion molded by the extruder 91 or the substrate 10 is a multiple-layer substrate 10' after being extrusion molded by at least two extruders. As illustrated in FIG. 10, the substrate is a two-layer substrate 10', wherein a first part 111 of the two-layer substrate 10' is flexible and is made of PVC material, plasticizer, and calcium carbonate, wherein a second part 112 of the substrate 10' is stiff and is made of foam material and vesicant. Referring to FIG. 11, the substrate is a three-layer substrate 10', wherein a first part 111 and a third part 113 of the three-layer substrate 10' is mad of foam material, and a foaming density of the first part 111 and a third part 113 is 0.5 T/m3 to 1.5 T/m3.

The method of making the plastic flooring further comprises a step of:

B. delivering the printing layer 20, wherein the printing layer 20 is blank and is delivered toward the rolling unit 40 by way of a second delivery roller mechanism 21.

The method of making the plastic flooring further comprises a step of:

C. rolling, wherein the rolling unit 40 rolls the substrate 10 and the printing layer 20 together so as to produce the plastic flooring material 1', and the printing layer 20 has three-dimensional embossing 22.

The rolling unit 40 includes five rollers, for example, the rolling unit 40 includes a first roller set 42 arranged on a machine frame 41, a second roller set 43, and a third roller set 44, wherein the first roller set 42 has two adjacent first rollers 421 arranged beside a first side of the second roller set 43, the second roller set 43 has a second roller 431 and multiple third rollers 432 surrounding the second roller 431, wherein a diameter of the second roller 431 is more than those of the multiple third rollers 432. The third roller set 44 includes multiple fourth rollers 441 fixed beside a second side of the second roller set 43, wherein at least one of the multiple fourth rollers 441 has imprinting patterns 442 formed thereon so as to roll the substrate 10 and the printing layer 20, by which the three-dimensional embossing 22 is formed on the printing layer 20.

The method of making the plastic flooring further comprises a step of:

D. digital printing, wherein the digital print unit 50 prints color material 95 on the three-dimensional embossing 22 of the printing layer 20.

The digital print unit 50 includes a first platform 51 mounted on a first base 51 and includes an imprint mechanism 53 located above the first platform 52, wherein the imprint mechanism 53 has a material collector 531, a first end of which connects with a first supply source (not shown) for supplying the color material 95, and a second end of the material collector 531 has a feeding portion 532 configured to output the color material 95.

The imprint mechanism 53 is controlled by the electronic control unit 80, when the plastic flooring material 1' is conveyed toward a first predetermined position, the feeding portion 532 imprints the color material 95 on the three-dimensional embossing 22 of the printing layer 20 based on a pattern setting of the electronic control system 50. When the digital print unit 50 prints the color material 95 on the printing layer 20, multiple positioning points are separated on the printing layer 20 beforehand based on a fixed length, a distance between any two adjacent of the multiple positioning points is equal to a diameter of each of the multiple fourth rollers 441, and multiple confirmation points are arranged between any two adjacent positioning points so as to confirm whether an imprinting travel is identical to a set travel of the electronic control system 50. The imprint mechanism 53 has a sensing element 533 electrically connected with the electronic control system 50. When the electronic control system 50 senses the multiple positioning points by using the sensing element 533, it controls the imprint mechanism 53 to imprint the color material 95 on the three-dimensional embossing 22.

The method of making the plastic flooring further comprises a step of:

E. coating the abrasion resistant layer 30, wherein the coating unit 60 coats wear-resistant materials on the printing layer 20, and the wear-resistant materials are UV or PVC mixing with plasticizer, stabilizer, and additives. Preferably, anti-mold antibacterial materials and anti-scratch material are added in the wear-resistant materials. The coating unit 60 includes a second platform 62 mounted on a second base 61 and has a coat mechanism 63 located above the second platform 62. A first end of the coat mechanism 63 connects with a second supply source (not shown) for supplying the wear-resistant materials, and a second end of the coat mechanism 63 outputs the wear-resistant materials. The coating mechanism 63 is controlled by the electronic control system 80, when the plastic flooring material 1' is conveyed to a second predetermined position, the wear-resistant materials are coated on the printing layer 20.

The method of making the plastic flooring further comprises a step of:

F. shaping, wherein the plastic flooring material 1' is shaped so as to dry and harden the abrasion resistant layer 30, wherein when the abrasion resistant layer 30 is made of PVC, it is dried and hardened; when the abrasion resistant layer 30 is made of UV, it is irradiated by an UV lamp. The abrasion resistant layer 30 dried and hardened in a baking manner. For example, the baking machine 70 includes a third platform 71 and includes an electric heat source 72 arranged on the third platform 71, wherein the baking machine 70 is controlled by the electronic control unit 80 so that when the plastic flooring material 1' is conveyed toward the third platform 71, the electric heat source 72 bakes the plastic flooring material 1' in a high temperature.

The method of making the plastic flooring further comprises a step of:

G cutting, wherein the plastic flooring material 1' is cut into multiple plastic floorings 1 in a desired size after being baked in the step F and cooled in a room temperature. The plastic flooring 1 is stiff and includes a retainer 93 and a locking recess 94 which are formed on two opposite sides of the plastic flooring 1. When two plastic floorings 1 are connected, a retainer 93 of one plastic flooring 1 engages with a locking recess 94 of the other plastic flooring 1.

In another embodiment, after the step C, the plastic flooring material 1' is cut into multiple parts in the desired size, and the parts of the flooring material 1' is processed in the steps D, E, and F.

Thereby, the printing layer 20 has the three-dimensional embossing 22 so as to enhance aesthetics appearance of the plastic flooring 1.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of making plastic flooring comprising steps of:
   A. providing a substrate and delivering the substrate toward a rolling unit;
   B. delivering a printing layer, wherein the printing layer is blank and is delivered toward the rolling unit by way of a second delivery roller mechanism;
   C. rolling, wherein the rolling unit rolls the substrate and the printing layer together so as to produce the plastic flooring material, and the printing layer has three-dimensional embossing;
   D. digital printing, wherein color material being printed on the three-dimensional embossing of the printing layer by using a digital print unit;

E. coating an abrasion resistant layer, wherein a coating unit coats wear-resistant materials of the abrasion resistant layer on the printing layer; and F. shaping, wherein the plastic flooring material is shaped so as to dry and harden the abrasion resistant layer.

2. The method as claimed in claim 1, wherein the substrate is extrusion molded by using an extruder and is delivered toward the rolling unit or the substrate is rolled and delivered toward the rolling unit by using a first delivery roller mechanism.

3. The method as claimed in claim 1, wherein the rolling unit includes five rollers which are a first roller set arranged on a machine frame, a second roller set, and a third roller set, wherein the first roller set has two adjacent first rollers arranged beside a first side of the second roller set, the second roller set has a second roller and multiple third rollers surrounding the second roller, wherein a diameter of the second roller is more than those of the multiple third rollers, the third roller set includes multiple fourth rollers fixed beside a second side of the second roller set, wherein at least one of the multiple fourth rollers has imprinting patterns formed thereon so as to roll the substrate and the printing layer, by which the three-dimensional embossing is formed on the printing layer.

4. The method as claimed in claim 1, wherein the digital print unit includes a first platform mounted on a first base and includes an imprint mechanism located above the first platform, wherein the imprint mechanism has a material collector, a first end of which connects with a first supply source for supplying the color material, and a second end of the material collector has a feeding portion configured to output the color material; the imprint mechanism is controlled by the electronic control unit, when the plastic flooring material is conveyed toward a first predetermined position, the feeding portion imprints the color material on the three-dimensional embossing of the printing layer based on a pattern setting of the electronic control system.

5. The method as claimed in claim 4, wherein when the digital print unit prints the color material on the printing layer, multiple positioning points are separated on the printing layer beforehand based on a fixed length.

6. The method as claimed in claim 1, wherein the coating unit includes a second platform mounted on a second base and has a coat mechanism located above the second platform, a first end of the coat mechanism connects with a second supply source for supplying the wear-resistant materials, and a second end of the coat mechanism outputs the wear-resistant materials, wherein the coating mechanism is controlled by the electronic control system, when the plastic flooring material is conveyed to a second predetermined position, the wear-resistant materials are coated on the printing layer.

7. The method as claimed in claim 1, wherein in the step F, when the abrasion resistant layer is made of PVC, it is dried and hardened; when the abrasion resistant layer is made of UV, it is irradiated by an UV lamp; the abrasion resistant layer is dried and hardened in a baking manner, and the baking machine includes a third platform and includes an electric heat source arranged on the third platform, wherein the baking machine is controlled by the electronic control unit so that when the plastic flooring material is conveyed toward the third platform, the electric heat source bakes the plastic flooring material in a high temperature.

8. The method as claimed in claim 1 further a step of G, cutting after the step of F, wherein the plastic flooring material is cut into multiple plastic floorings in a desired size after being baked in the step F and cooled in a room temperature.

9. The method as claimed in claim 8, wherein the plastic flooring is stiff and includes a retainer and a locking recess which are formed on two opposite sides of the plastic flooring, when two plastic floorings are connected, a retainer of one plastic flooring engages with a locking recess of the other plastic flooring.

10. The method as claimed in claim 1, wherein after the step C, the plastic flooring material is cut into multiple parts in a desired size, and the parts of the flooring material is processed in the steps D, E, and F.

11. The method as claimed in claim 1, wherein the substrate is a sole-layer substrate after being extrusion molded by the extruder or the substrate is a multiple-layer substrate after being extrusion molded by at least two extruders.

* * * * *